R. L. FRINK.
VALVE FOR REGULATING THE VOLUME AND PRESSURE OF FLUIDS.
APPLICATION FILED MAR. 29, 1906.
953,133.
Patented Mar. 29, 1910.
2 SHEETS—SHEET 1.
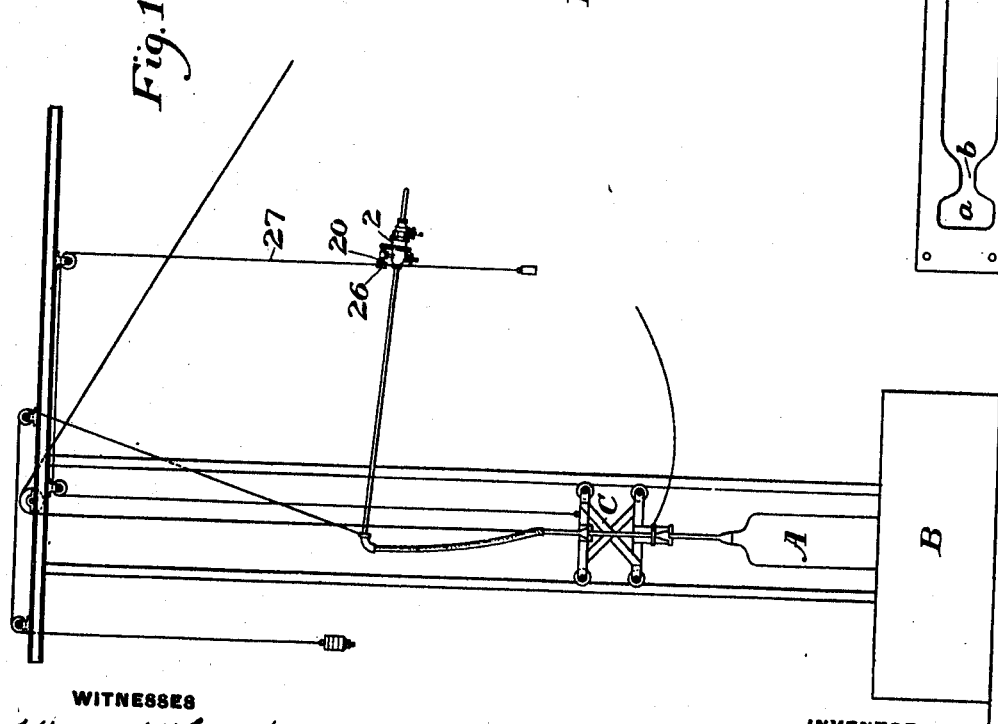

R. L. FRINK.
VALVE FOR REGULATING THE VOLUME AND PRESSURE OF FLUIDS.
APPLICATION FILED MAR. 29, 1906.
953,133.
Patented Mar. 29, 1910.
2 SHEETS—SHEET 2.
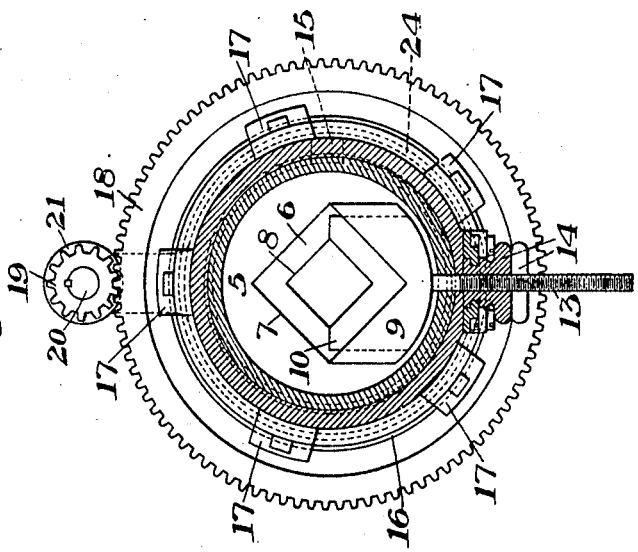
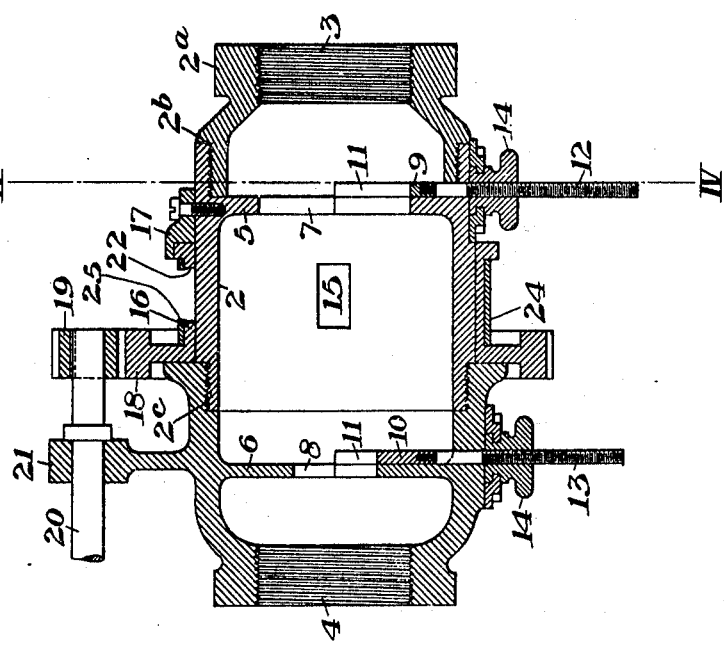
WITNESSES
Warren W. Swartz
R A Balderson
INVENTOR
Robert L. Frink,
by Bakewell & Byrnes,
his attys.

UNITED STATES PATENT OFFICE.

ROBERT L. FRINK, OF BELLE VERNON, PENNSYLVANIA, ASSIGNOR TO WINDOW GLASS MACHINE COMPANY, OF PITTSBURG, PENNSYLVANIA, A CORPORATION OF NEW JERSEY.

VALVE FOR REGULATING THE VOLUME AND PRESSURE OF FLUIDS.

953,133.      Specification of Letters Patent.     Patented Mar. 29, 1910.

Application filed March 29, 1906. Serial No. 308,695.

*To all whom it may concern:*

Be it known that I, ROBERT L. FRINK, of Belle Vernon, Fayette county, Pennsylvania, have invented a new and useful Valve for Regulating the Volume and Pressure of Fluids, of which the following is a full, clear, and exact description, reference being had to the accompanying drawings, forming part of this specification, in which—

Figure 1 is a diagram illustrating one application of my invention; Fig. 2 is a side elevation of the valve; Fig. 3 is a section on the line III—III of Fig. 2; Fig. 4 is a section on the line IV—IV of Fig. 3; and Fig. 5 is a plan view of one form of the removable valve band.

My invention is designed to provide a novel form of valve for controlling or regulating the volume and pressure of fluids, and it consists in the novel construction, arrangement and combination of parts all substantially as hereinafter described and pointed out in the appended claims.

In the accompanying drawings, the numeral 2 designates the valve body or shell, having at one end portion an inlet opening 3 and at the opposite end portion an outlet opening 4 which is connected with the apparatus which is to be supplied with fluid; the casing or shell 2 is formed with the interior diaphragms or partitions 5 and 6, in which are formed respectively the ports 7 and 8. The port 7 is controlled by a gate valve 9, and port 8 is controlled by a similar valve 10. These valves are preferably but not necessarily of the form shown in Fig. 4, that is to say, their upper edge portions are formed with V-shaped recesses 11 which register with the ports 7 and 8, the latter being of square form, but with their greatest dimensions lying in horizontal and vertical planes. The valves are provided with the respective adjusting stems 12 and 13, and the desired adjustment is secured by means of the nuts 14.

Intermediate of the partitions or diaphragms 5 and 6 the casing or shell 2 is formed with an escape opening 15. Fitting around the exterior of the casing or shell over the said opening is a movable ring 16 which is guided by lugs 17 secured to the shell 2, and which is formed with a projecting gear-toothed flange 18, the teeth of which mesh with a pinion 19 of a shaft 20 provided with a bearing 21 in a lug or extension of the casing 2.

The ring 16 is, as shown in Fig. 3, provided with a circumferentially extending slot 22, which is of substantially the same width as the escape opening 15 and which extends nearly around the circumference of the ring, its ends being separated by the portion 23 of solid metal. Placed around the ring 16 over the slot 22 is a band 24 which is preferably of thin sheet steel. Formed in this band is a circumferentially extending opening 25, the form and shape of which depends upon the particular operation to be controlled by the valve, these rings being removable and interchangeable.

Fig. 5 shows the opening 25 substantially as it would be used for controlling the air admitted to a hollow glass cylinder in the process of drawing the same. In starting the drawing operation, and while the neck is being formed, but comparatively little air is necessary, and the opening 25 is formed with the wide portion *a* which permits the escape of most of the air which enters the valve. While the cap portion of the cylinder is being drawn, an increase is required in the volume of air, and this is controlled by the narrow portion *b* of the opening. After the full diameter of the cylinder is reached, less air is required, and the opening 25 is therefore again expanded at *c*, to control the air admission during the drawing of the body portion of the cylinder. The portion *c* is gradually contracted, however, to increase the pressure and volume of air as the glass cools in drawing.

As will be seen the ring 24 forms a valve for controlling the escape from the opening 15, the amount of fluid which is permitted to escape from the said opening being controlled by the shape of the slot in this ring and its position. This ring is secured to the ring 16 to rotate therewith.

In order to facilitate removing of the parts and access to the valve, the inlet end portion $2^a$ of the casing or shell 2 is made in a separate piece and is united to the shell by means of the threaded connection at $2^b$. The body portion of the shell is also preferably made in two parts united by the screw-threaded connection $2^c$.

The valves 9 and 10 being properly adjusted, the amount of fluid which is permitted to pass out through the port 8 and outlet 4 will depend upon the adjustment and character of the valve ring 24. This ring is moved with the ring 16 by rotating the shaft 20 to thereby rotate the ring 16 on the valve body or shell. The shaft 20 may be rotated by hand, or automatically by connection with the apparatus whose operation the valve controls. Thus, in Fig. 1, I have shown the valve as arranged to control the volume and pressure of air which is admitted to the interior of a glass cylinder A while it is being drawn from a melting pot B by means of drawing apparatus C. As is well known, the volume of air admitted to the interior of this cylinder requires to be varied during different portions of the drawing operation, which is conducted at different speeds. I have shown the shaft 20 of the valve as provided with a pulley 26 over which is passed the cord 27 which is connected to the drawing apparatus C, whereby said shaft 20 will operate to shift the ring 24 to automatically regulate the pressure during the different portions of the drawing operation.

My invention is adapted for use for various purposes where it is desired to control either automatically or manually the volume and pressure of fluid.

The advantages of my invention consist in the simplicity of the valve and in the facility with which it may be adapted for use in connection with different operations by means of the interchangeable valve rings 24.

What I claim is:—

1. In a pressure regulating device of the character described, a valve chamber having inlet and outlet ports, means for controlling the relative areas of the said ports, said chamber having an escape opening intermediate of the inlet and outlet ports, and means for varying the area of the escape opening; substantially as described.

2. In a pressure regulating valve, the combination with a valve chamber having an inlet and an outlet and an escape opening, of a relatively movable valve for controlling the escape opening having a port of variable capacity at different portions of its length in the line of movement over said opening, substantially as described.

3. A pressure regulating device having inlet and outlet ports, valves for varying the areas of said ports, an escape opening intermediate the said ports, a movable and interchangeable valve for controlling the escape opening, and means for changing the position of the said valve; substantially as described.

4. In a pressure regulating device, a pressure chamber or passage having an escape opening, and a valve member for controlling the escape opening, said valve member being interchangeable and having a port the area of which varies at different portions thereof; substantially as described.

5. In a pressure regulating device, a valve body or shell having inlet and outlet ports, valves for controlling said ports, an escape opening between said ports, a slotted ring rotatable on the valve body over the escape opening, and a slotted valve ring or band removably secured to and rotatable with the first-named ring; substantially as described.

6. In glass drawing apparatus, a movable drawing device, means for supplying air to the article being drawn, and means for controlling the pressure and volume of the supplied air, said means consisting of a valve body or casing having inlet and outlet ports and an escape opening intermediate the said ports, and a control valve for the escape opening comprising a band with a slot of variable capacity, and operating mechanism connected directly to the drawing device; substantially as described.

7. In a pressure regulating device, a valve body or casing having an inlet port and an outlet port, ported diaphragms intermediate the said ports, valves for controlling the ports of the diaphragms, an escape opening intermediate the diaphragms, and valve means for controlling the area of the escape opening; substantially as described.

8. In a pressure regulating device, a valve body or casing having inlet and outlet ports, and an escape opening intermediate said ports, a member rotatably mounted on the said valve or casing and having a port of variable width movable over the opening, and valve means carried by said member for controlling the escape opening, together with automatic means for actuating said member; substantially as described.

9. In a pressure regulating device, a valve body or casing having inlet and outlet ports, and an escape opening intermediate the said ports, of a ring rotatably mounted on the body or casing and having a port therein, means for rotating the ring, and a removable ported valve member carried by the ring; substantially as described.

In testimony whereof, I have hereunto set my hand.

ROBERT L. FRINK.

Witnesses:
H. M. CORWIN,
GEO. H. PARMELEE.